United States Patent [19]

Bala

[11] Patent Number: 4,846,344

[45] Date of Patent: Jul. 11, 1989

[54] SHEATH FOR THERMOMETER AND THE LIKE

[76] Inventor: Harry Bala, 2024 Williamsburg Dr., Streamwood, Ill. 60107

[21] Appl. No.: 212,969

[22] Filed: Jun. 29, 1988

[51] Int. Cl.$^4$ ............................................. B65D 85/38
[52] U.S. Cl. .................................. 206/306; 206/363; 206/804
[58] Field of Search .................. 206/39.3, 39.5, 39.6, 206/212, 306, 363, 804; 229/87 G

[56] References Cited

U.S. PATENT DOCUMENTS

| | | | |
|---|---|---|---|
| 1,329,056 | 1/1920 | Wrapper | 229/87 G |
| 1,857,488 | 5/1932 | Weeks | 206/39.5 |
| 2,140,748 | 12/1938 | Johanson | 229/87 G |
| 3,104,011 | 9/1963 | Bowman | 206/804 |
| 3,106,333 | 10/1963 | Bulovic | 229/87 G |
| 3,215,265 | 11/1965 | Welin-Berger | 206/306 |
| 3,752,309 | 8/1973 | Hopkins et al. | 206/306 |
| 3,759,370 | 9/1973 | Blatz | 206/306 |
| 3,809,228 | 5/1974 | Fowler | 206/306 |
| 4,051,950 | 10/1977 | Järund | 206/306 |
| 4,197,944 | 4/1980 | Catlin | 206/306 |
| 4,464,552 | 8/1984 | Pawlowski | 206/804 |

FOREIGN PATENT DOCUMENTS 21518 of 1907 United Kingdom ............... 206/39.3

Primary Examiner—David T. Fidei
Attorney, Agent, or Firm—Gerstman & Ellis, Ltd.

[57] ABSTRACT

A packaged sheath for a probe comprises a backing web, a flattened probe sheath having an open and a closed end and made of a pair of connected flat sides, and first and second tab members sealed to respective flat sides of the sheath adjacent the open end. The tab members serve as a gripping handle for the sheath, the first tab member having an outer end projecting beyond the second tab member. An upper web is peripherally sealed to the backing web at side areas, the first and second tab members projecting outwardly beyond the ends of the backing web and upper web adjacent the sheath open end. This permits easy grasping of the tab members without grasping of the backing or upper web, having advantages as described.

4 Claims, 1 Drawing Sheet

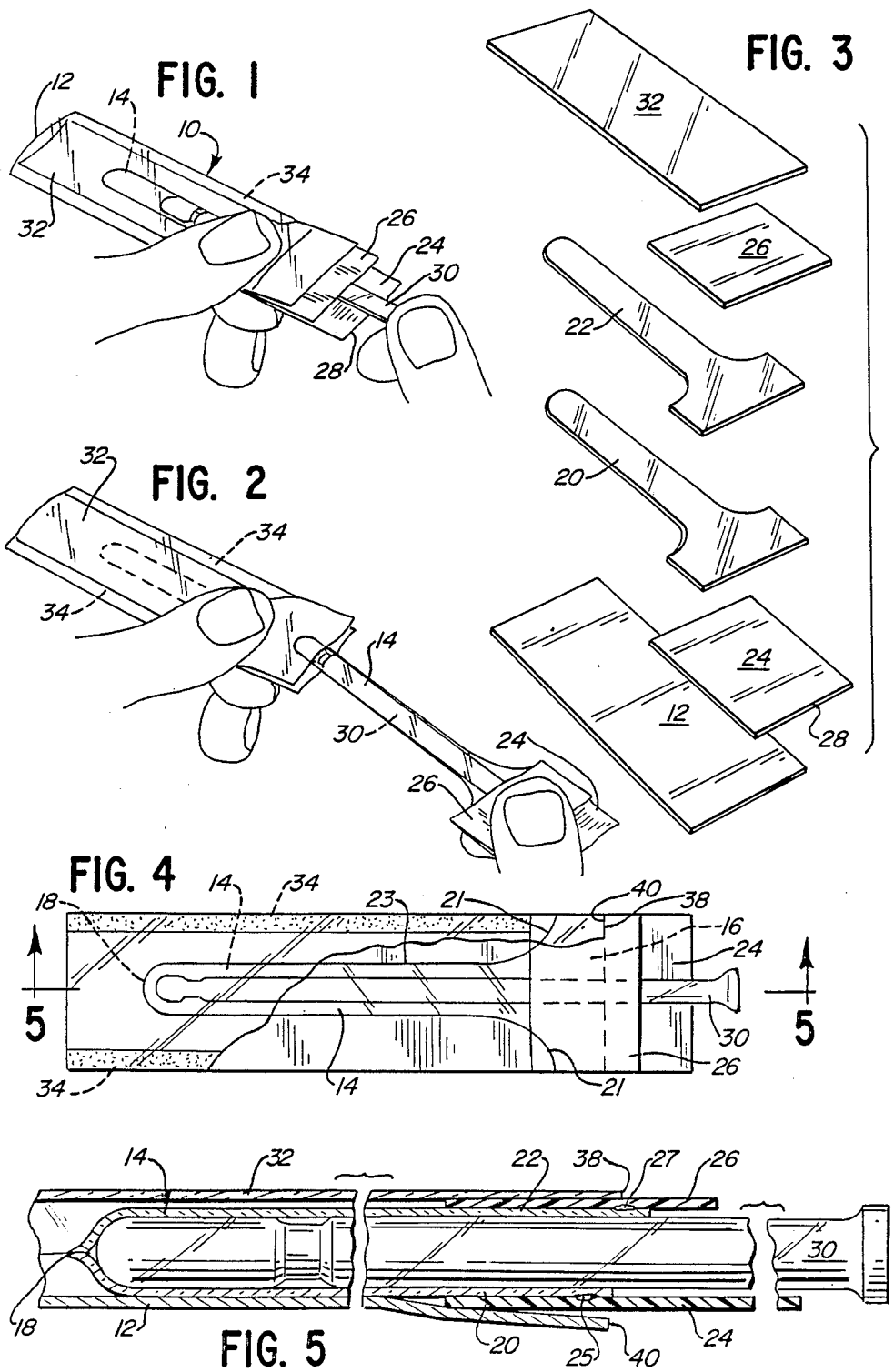

SHEATH FOR THERMOMETER AND THE LIKE

BACKGROUND OF THE INVENTION

Increasingly, hospitals, clinics and the like are providing a disposable sheath to mouth and rectal thermometers that are used with patients. Typically, the thermometer itself is sterilized with alcohol between uses, but such a disposable sheath provides added protection against the possible spread of disease between the patients by its use. Additionally, the sheath provides added protection to the patient should the thermometer be broken while inserted in the patient.

Various designs of packaged thermometer sheaths are currently commercially available to hospitals and clinics, with each sheath coming in a little flat package, often in strips of packaged sheaths with connecting backings which may be torn apart at perforations.

Typically, these packaged sheaths carry a flattened probe sheath between a backing web and an upper web. The webs may be peripherally sealed together at side areas. Some packages may be opened by grasping a pair of plastic tabs after thermometer insertion, each of which is sealed to an opposed side of the open end of the flattened probe sheath, and then pulling away the sheath from the package. Alternatively, some packaged sheaths are openable by tearing apart the outer backing and upper webs to expose the probe sheath, after a thermometer has been inserted into the probe sheath.

Hopkins et al. U.S. Pat. No. 3,752,309 and Welin-Berger U.S. Pat. No. 3,215,265 each disclose a thermometer sheath package which comprises a flattened probe sheath positioned between an outer backing web and an upper web, peripherally sealed to serve as a package for the flattened probe sheath. However, in both the Hopkins et al. and Welin-Berger patents, certain difficulties are encountered in the insertion of the thermometer into the probe sheath, because when one grasps the lower tab attached to the lower surface of the flattened probe sheath to insert a thermometer, one almost inevitably grasps the lower backing web as well because of the length of the backing web. This can interfere with the sliding of the thermometer into the probe sheath, with wrinkles being formed in the probe sheath, since the grasping of the lower backing web along with the probe sheath can cause wrinkling of the probe sheath. Accordingly, users of sheath packages of the Hopkins et al. or Welin-Berger types often go to the trouble to fold the end of the backing web double, away from the mouth of the probe sheath, to fully expose the tabs for grasping prior to insertion of the thermometer. By the invention of this application, that inconvenient step is rendered unnecessary, providing an improvement in the utilization of the product of this invention.

Also, to remove the thermometer and sheath from the outer package, one has to fold the end of the backing web away in the Hopkins et al. and Welin-Berger patents in order to grasp both of the tabs that connect to the open mouth of the flattened sheath, prior to twisting the thermometer and sheath lose from the package. This procedure also is rendered more simple and expeditious by the structure of this invention, in that the need for the folding step of the backing web is eliminated.

DESCRIPTION OF THE INVENTION

The invention of this application relates to a packaged sheath for a probe. The sheath package comprises a backing web, plus a flattened probe sheath having an open end and a closed end, with the sheath defining a pair of connected, flat sides. First and second tab members are sealed to the respective flat sides of the sheath adjacent the open end thereof, to serve as a gripping handle for the sheath. The second tab member has an outer end which projects beyond the first tab member. An upper web is provided, being peripherally sealed to the backing web side areas.

In accordance with this invention, the first and second tab members project outwardly beyond the ends of the backing web and upper web adjacent the open end of the sheath. The effect of this is to permit easy grasping of the tab members without grasping of the backing web or upper web. This facilitates both insertion of a thermometer or the like into the sheath without wrinkling of the sheath, and also facilitates twist-removal of the thermometer and sheath from the outer package defined by the backing and upper webs.

It is preferable for the flattened probe sheath and tab members to be free of permanent adhesion to any portion of the backing and upper webs. If desired, a temporary tack-type adhesion may be provided to typically one side of the flattened probe sheath and either the backing web or the upper web, but this tack adhesion should be weak enough so that the probe sheath, when surrounding a thermometer, may be easily removed by twisting from the outer package comprising the backing and upper webs, without breaking of any line of perforation or the like. This, however, does not exclude the possibility of removing the probe sheath by tearing apart the backing and upper webs along the peripheral seal lines between the upper and backing webs.

Additionally, the backing web and upper web preferably define ends adjacent the open end of the sheath which are in substantially colinear relation, i.e., the two lines defined by the respective ends of the two webs in their initial configuration, before insertion of a thermometer, are substantially side-by-side in relation. They come close to defining a single line but for the fact that each web end is a different physical structure, and the ends are separated by the flattened sheath and tabs.

DESCRIPTION OF DRAWINGS

FIG. 1 is a perspective view of the packaged sheath of this invention shown in the process of receiving a thermometer into the sheath;

FIG. 2 is a perspective view of FIG. 1, shown in a later stage of removal of the sheathed thermometer from the outer package comprising the backing and upper webs;

FIG. 3 is an exploded perspective view of the various parts of the packaged sheath of this invention;

FIG. 4 is a plan view of the packaged sheath of FIG. 1, showing a thermometer in inserted relation within the sheath; and FIG. 5 is an enlarged sectional view taken along line 5—5 of FIG. 4.

DESCRIPTION OF SPECIFIC EMBODIMENT

Referring to the drawings, the packaged sheath 10 of this invention comprises a backing web 12 and a flattened probe sheath 14, having an open end 16 and a closed end 18. Sheath 14 is defined by a pair of connected flat sides 20, 22 which are sealed together along peripheral seal line 23 in conventional manner to form probe sheath 14.

First tab member 24 is sealed to the end of probe sheath side 20 by a seal line 25, as shown particularly in FIG. 5. Similarly, second tab member 26 is sealed to probe sheath side 22 by seal line 27. This seal line may be any type of desired seal, for example a hot bar seal, an R.F. seal, or an adhesive line. Tab members 24, 26 serve as a gripping handle for sheath 14. It can be seen that first tab member 24 is longer than second tab member 26, so that the end 28 of first tab member 24 projects beyond the corresponding end of second tab member 26. This facilitates the gripping of first tab member 24 without grasping second tab member 26, for separation of the two tab members to facilitate insertion of a thermometer 30 into probe sheath 14. The extensions 21 of seal line 23 may also be used for added bonding of tabs 24, 26 to the respective members 20, 22.

Upper web 32 is also provided, being peripherally sealed to backing web 12 along the sides thereof at seal lines 34, which may be conventional in nature. The respective ends of backing web 12 and upper web 32 may be left unsealed.

Flattened probe sheath 14, and the attached tabs 24, 26, are free of permanent adhesion to any portion of backing web 12 and upper web 32. Preferably, probe sheath 14 is entirely free of adhesion to upper web 32, while lower surface portion 20 of probe sheath 14 is adhered to backing web 12 by a light tack seal which is easily broken by pulling or twisting probe sheath 14 after insertion of thermometer 30.

Backing web 12 and upper web 32 define ends 38, 40 adjacent the open end 16 of sheath 14 that are in substantially colinear relation; i.e., in the original, flattened form, ends 38, 40 practically coincide with each other but for the fact that they are defined by different sheaths and are separated by flattened probe sheath 14.

The packaged sheath of this invention may be made by a conventional assembly technique by the appropriate stamping out and bonding of various sheet materials of types conventionally selectable by those skilled in the art.

In accordance with this invention, first and second tab members 24, 26, project outwardly beyond the respective ends 38, 40 of upper web 32 and backing web 12, so that, unlike prior art configurations, it is not necessary to fold a portion of the backing rearwardly in order to get good gripping access to one or both tabs.

For insertion of the thermometer 30 into sheath 14, one may initiate the insertion as shown in FIG. 1, but it is generally preferable to then grasp first tab member 24 only and to advance thermometer 30 relative to it until the thermometer is completely seated within sheath 14. Thus the sheath can be stretched to remain unwrinkled and unkinked as the thermometer is advanced. Contrarywise, if one also grasps backing web 12 along with the first tab as the thermometer is being advanced, wrinkles in sheath 14 may form which interfere with the advancement of the thermometer or other elongated object into the sheath. By this invention, that disadvantage is eliminated by the shortening of backing web 12, so that one does not have to take the positive step of folding and end of the backing web out of the way prior to advancing the thermometer.

Then, when it is desired to remove the thermometer emplaced in the probe sheath from the envelope defined by backing and upper webs 12, 32, one may grasp both tab members 24, 26 as shown in FIG. 2. Once again, this is done more easily in accordance with this invention than in either of the Welin-Berger or Hopkins et al. designs without grasping either web 12, 32. One simply then rotates thermometer 30 to snap sheath 14 loose from its light adhesion to the webs if any such is present, and then removing the thermometer and probe sheath for use, with great ease as shown in FIG. 2.

If desired, the thermometer emplaced in probe sheath 14 may also be removed by tearing apart of webs 12, 32 along their seal lines 34, for those users who have been trained in that opening technique. Accordingly, the packaged sheath may be opened by the user in either of the two major ways that thermometer sheaths are customarily opened: either by the twist-out technique or by the peel-open technique, so that nurses and the like can continue with their accustomed procedure of opening, irrespective of what it is.

Accordingly, the packaged sheath of this invention provides improvements in manufacture and use over the prior art, being easier to use then the designs of the previously cited patents, and requiring less material for manufacture, particularly with a reduced size backing web, for economy in mass production.

The above has been offered for illustrative purposes only, and is not intended to limit the scope of the invention of this application, which is as defined in the claims below.

That which is claimed is:

1. A packaged sheath for a probe, which comprises:
   a backing web;
   a flattened probe sheath having an open end and a closed end, said sheath defining a pair of connected, flat sides,
   first and second tab members sealed to respective flat sides of the sheath adjacent said open end to serve as a gripping handle for said sheath, said first tab member having an outer end projecting beyond said second tab member; and an upper web peripherally sealed to said backing web at side areas, said open end of the sheath projecting outwardly beyond the ends of said backing web and upper web adjacent said sheath open end to permit easy grasping thereof without grasping said backing or upper web.

2. The packaged sheath of claim 1 in which said flattened probe sheath and tab members are free of permanent adhesion to any portion of said backing and upper webs.

3. The packaged sheath of claim 1 in which the backing web and upper web define ends adjacent the open end of said sheath that are in substantially colinear relation.

4. A packaged sheath for a probe, which comprises:
   a backing web;
   a flattened probe sheath having an open end and a closed end, said sheath defining a pair of connected, flat sides,
   first and second tab members sealed to respective, flat sides of the sheath adjacent said open end to serve as a gripping handle for said sheath, said first tab member having an outer end projecting beyond said second tab member; and an upper web peripherally sealed to said backing web at side areas, said open end of the sheath projecting outwardly beyond the ends of said backing web and upper web adjacent said sheath open end to permit easy grasping thereof without grasping said backing or upper web, said flattened probe sheath and tab members being free of permanent adhesion to any portion of said backing and upper webs, said backing web and upper web defining ends adjacent the open end of said sheath that are in substantially colinear relation.

* * * * *